(12) United States Patent
Kim (10) Patent No.: US 12,250,337 B2
(45) Date of Patent: Mar. 11, 2025

(54) ELECTRONIC APPARATUS AND METHOD OF SELECTIVELY APPLYING SECURITY MODE IN MOBILE DEVICE

(71) Applicant: Seungman Kim, McLean, VA (US)

(72) Inventor: Seungman Kim, McLean, VA (US)

( * ) Notice: Subject to any disclaimer, the term of this patent is extended or adjusted under 35 U.S.C. 154(b) by 84 days.

(21) Appl. No.: 18/226,356

(22) Filed: Jul. 26, 2023

(65) Prior Publication Data

US 2023/0370539 A1    Nov. 16, 2023

Related U.S. Application Data

(60) Division of application No. 18/088,671, filed on Dec. 26, 2022, now Pat. No. 11,838,437, which is a
(Continued)

(51) Int. Cl.
| | |
|---|---|
| *H04W 12/06* | (2021.01) |
| *H04M 1/67* | (2006.01) |
| *H04M 1/673* | (2006.01) |
| *H04M 1/72412* | (2021.01) |
| *H04M 1/72448* | (2021.01) |
| *H04M 1/72463* | (2021.01) |

(Continued)

(52) U.S. Cl.
CPC ......... *H04M 1/72412* (2021.01); *H04M 1/67* (2013.01); *H04M 1/673* (2013.01); *H04M 1/72448* (2021.01); *H04M 1/72463* (2021.01); *H04M 1/724631* (2022.02); *H04M 1/72469* (2021.01); *H04W 12/06* (2013.01); *H04W 12/08* (2013.01); *H04W 52/0251* (2013.01); *H04W 52/0274* (2013.01); *H04M 1/66* (2013.01); *H04M 1/72451* (2021.01); *H04M 1/72457* (2021.01); *Y02D 30/70* (2020.08)

(58) Field of Classification Search
None
See application file for complete search history.

(56) References Cited

U.S. PATENT DOCUMENTS

| | | |
|---|---|---|
| 5,731,801 A | 3/1998 | Fukuzaki |
| 7,400,878 B2 | 7/2008 | Hassan et al. |

(Continued)

FOREIGN PATENT DOCUMENTS

| | | |
|---|---|---|
| EP | 2364004 A1 | 9/2011 |
| KR | 1020110049368 | 5/2011 |
| KR | 1020120038777 | 4/2012 |
| KR | 10-2061913 | 1/2020 |
| WO | 2004070591 A1 | 8/2004 |
| WO | 2006090899 A1 | 8/2006 |

(Continued)

OTHER PUBLICATIONS https://manuals.info.apple.com/MANUALS/1000/MA1658/en_US/iphone_ios6_user_guide.pdf

(Continued)

*Primary Examiner* — Idowu O Osifade
(74) *Attorney, Agent, or Firm* — Seungman Kim; EIPG (57) ABSTRACT

A method of a mobile device to photograph an object includes controlling a panel to display an image and to receive a user input, and controlling a network interface to wirelessly communicate with an external network comprising an access point, unlocking the mobile device according to an area condition and a wireless communication condition comprising a wireless communication with the external network when the mobile device is in a time condition, and unlocking the mobile device according to a password when the mobile device is not in the time condition.

30 Claims, 8 Drawing Sheets

Related U.S. Application Data division of application No. 17/524,823, filed on Nov. 12, 2021, now Pat. No. 11,553,072, which is a division of application No. 16/679,181, filed on Nov. 9, 2019, now Pat. No. 11,184,771, which is a division of application No. 16/402,275, filed on May 3, 2019, now Pat. No. 10,511,975, which is a division of application No. 16/166,078, filed on Oct. 20, 2018, now Pat. No. 10,299,133, which is a division of application No. 16/127,286, filed on Sep. 11, 2018, now Pat. No. 10,149,164, which is a continuation of application No. 15/984,375, filed on May 20, 2018, now Pat. No. 10,085,151, which is a continuation of application No. 15/972,135, filed on May 5, 2018, now Pat. No. 10,111,098, which is a division of application No. 15/853,870, filed on Dec. 25, 2017, now Pat. No. 9,973,929, which is a continuation of application No. 15/297,069, filed on Oct. 18, 2016, now Pat. No. 10,064,056, which is a continuation-in-part of application No. 14/181,728, filed on Feb. 17, 2014, now Pat. No. 9,509,822.

(51) Int. Cl.
*H04M 1/72469* (2021.01)
*H04W 12/08* (2021.01)
*H04W 52/02* (2009.01)
*H04M 1/66* (2006.01)
*H04M 1/72451* (2021.01)
*H04M 1/72457* (2021.01)

(56) References Cited

U.S. PATENT DOCUMENTS

| | | |
|---|---|---|
| 8,233,789 B2 | 7/2012 | Brunner |
| 8,245,143 B2 | 8/2012 | Yach et al. |
| 8,276,085 B2 | 9/2012 | Sherwani |
| 8,279,184 B2 | 10/2012 | Lowles et al. |
| 8,280,363 B2 | 10/2012 | Yoo |
| 8,284,179 B2 | 10/2012 | Bernstein |
| 8,284,211 B2 | 10/2012 | Darsu et al. |
| 8,302,033 B2 | 10/2012 | Matas et al. |
| 8,358,321 B1 | 1/2013 | Weidner |
| 8,600,056 B2 | 12/2013 | Heurtaux et al. |
| 8,600,060 B2 | 12/2013 | Priestley et al. |
| 8,600,120 B2 | 12/2013 | Gonion et al. |
| 8,613,070 B1 | 12/2013 | Borzycki et al. |
| 8,626,125 B2 | 1/2014 | Lee |
| 8,627,433 B2 | 1/2014 | Conner et al. |
| 8,627,438 B1 | 1/2014 | Bhimanaik |
| 8,646,069 B2 | 2/2014 | Kim et al. |
| 8,649,759 B2 | 2/2014 | Scott et al. |
| 8,665,238 B1 | 3/2014 | Gossweiler et al. |
| 8,751,065 B1 | 6/2014 | Kato |
| 8,826,178 B1 | 9/2014 | Zhang |
| 8,994,499 B2 | 3/2015 | Zhao et al. |
| 9,076,029 B2 | 7/2015 | Free |
| 9,230,158 B1 | 1/2016 | Ramaswamy |
| 2003/0073448 A1 | 4/2003 | Ozeki et al. |
| 2004/0203895 A1 | 10/2004 | Balasuriya |
| 2005/0073388 A1 | 4/2005 | Lee et al. |
| 2006/0128305 A1 | 6/2006 | Delalat |
| 2006/0242434 A1 | 10/2006 | Lee |
| 2007/0197261 A1 | 8/2007 | Humbel |
| 2007/0271512 A1 | 11/2007 | Knight et al. |
| 2007/0277230 A1 | 11/2007 | Hawkins et al. |
| 2008/0070503 A1 | 3/2008 | Bang |
| 2008/0262839 A1 | 10/2008 | Nonaka et al. |
| 2008/0307360 A1 | 12/2008 | Chaudhri |
| 2009/0011796 A1 | 1/2009 | Ormson |
| 2009/0160792 A1 | 6/2009 | Morohoshi et al. |
| 2009/0267912 A1 | 10/2009 | Wada |
| 2009/0271704 A1 | 10/2009 | Cohen |
| 2010/0008031 A1 | 1/2010 | Reifman et al. |
| 2010/0313050 A1 | 12/2010 | Harrat et al. |
| 2011/0070864 A1 | 3/2011 | Karam |
| 2011/0098087 A1 | 4/2011 | Tseng |
| 2011/0151934 A1 | 6/2011 | Geng |
| 2011/0161869 A1 | 6/2011 | Yoo |
| 2011/0212706 A1 | 9/2011 | Uusilehto |
| 2012/0009896 A1 | 1/2012 | Bandyopadhyay et al. |
| 2012/0032979 A1 | 2/2012 | Blow et al. |
| 2012/0081392 A1 | 4/2012 | Arthur |
| 2012/0154413 A1* | 6/2012 | Kim .............. H04M 1/72448 345/530 |
| 2012/0159139 A1 | 6/2012 | Kim et al. |
| 2012/0162261 A1 | 6/2012 | Kim et al. |
| 2012/0174021 A1 | 7/2012 | Dharawat |
| 2012/0174237 A1 | 7/2012 | Krzyzanowsk |
| 2012/0179994 A1 | 7/2012 | Knowlton |
| 2012/0235790 A1 | 9/2012 | Zhao et al. |
| 2012/0251993 A1 | 10/2012 | Chidambaran |
| 2012/0297339 A1 | 11/2012 | Ito |
| 2013/0015946 A1 | 1/2013 | Lau et al. |
| 2013/0050120 A1 | 2/2013 | Takahashi et al. |
| 2013/0063611 A1 | 3/2013 | Papakipos et al. |
| 2013/0067566 A1 | 3/2013 | Oh |
| 2013/0076655 A1 | 3/2013 | Sipal et al. |
| 2013/0078951 A1* | 3/2013 | Mun .............. H04L 63/083 455/566 |
| 2013/0151963 A1 | 6/2013 | Costenaro et al. |
| 2013/0202161 A1 | 8/2013 | Shor et al. |
| 2013/0215060 A1 | 8/2013 | Nakamura et al. |
| 2013/0219345 A1 | 8/2013 | Saukko et al. |
| 2013/0219454 A1 | 8/2013 | Hewinson |
| 2013/0297675 A1 | 11/2013 | Li |
| 2013/0298024 A1 | 11/2013 | Rhee et al. |
| 2014/0022285 A1 | 1/2014 | Stovicek et al. |
| 2014/0028823 A1 | 1/2014 | Tahk et al. |
| 2014/0059365 A1 | 2/2014 | Heo et al. |
| 2014/0059673 A1 | 2/2014 | Azar et al. |
| 2014/0085460 A1 | 3/2014 | Park et al. |
| 2014/0118520 A1 | 5/2014 | Slaby et al. |
| 2014/0155031 A1 | 6/2014 | Lee et al. |
| 2014/0165187 A1 | 6/2014 | Kim et al. |
| 2014/0187200 A1 | 7/2014 | Reitter et al. |
| 2014/0203073 A1 | 7/2014 | Braun |
| 2014/0232633 A1 | 8/2014 | Shutlz |
| 2014/0237378 A1 | 8/2014 | Gonen |
| 2014/0282877 A1 | 9/2014 | Mahaffey et al. |
| 2014/0283135 A1 | 9/2014 | Shepherd et al. |
| 2014/0330569 A1 | 11/2014 | Kolavennu et al. |
| 2014/0359454 A1* | 12/2014 | Lee .............. G06F 3/048 715/734 |
| 2014/0364085 A1 | 12/2014 | Garcia |
| 2014/0366164 A1 | 12/2014 | Hoefgen et al. |
| 2015/0051913 A1 | 2/2015 | Choi |
| 2015/0147065 A1 | 5/2015 | Civelli et al. |
| 2015/0218872 A1 | 8/2015 | Breed |
| 2015/0223891 A1 | 8/2015 | Miller et al. |
| 2015/0358088 A1 | 12/2015 | Eim et al. |
| 2016/0109954 A1 | 4/2016 | Harris et al. |
| 2016/0142407 A1 | 5/2016 | Chun et al. |
| 2016/0155426 A1 | 6/2016 | Grunn et al. |
| 2017/0076077 A1 | 3/2017 | Zhao et al. |
| 2019/0020801 A1 | 1/2019 | Shultz |
| 2019/0174429 A1 | 6/2019 | Schillings et al. |

FOREIGN PATENT DOCUMENTS

| | | |
|---|---|---|
| WO | 2012049942 | 4/2012 |
| WO | 2012093784 A2 | 7/2012 |

OTHER PUBLICATIONS https://www.youtube.com/watch?v=VQKMoT-6XSg
https://www.youtube.com/watch?v=yRvOlkSELNI&t=183s
https://www.youtube.com/watch?v=xnLxKZK0fYU&t=707s
https://www.youtube.com/watch?v=vOQXtR-mJKk&t=310s
https://www.youtube.com/watch?v=nWdP0BJ8Wxg&t=13s (56) References Cited

OTHER PUBLICATIONS https://web.archive.org/web/20140214075541/https://www.gsmarena.com/motorola_moto_x-5601.php
https://www.gottabemobile.com/15-hidden-moto-x-features
https://web.archive.org/web/20140210190047/http://www.talkandroid.com/reviews/phone/moto-xreview-finally-a-smartphone-with-features-that-matter/
https://bgr.com/general/motorola-moto-x-review/
https://www.middletownpress.com/news/article/Motorola-Moto-X-less-hello-Moto-more-hello-11784000.php
https://web.archive.org/web/20140122063707/https://phandroid.com/2013/08/23/motorola-moto-xreview-video/
https://www.cnet.com/tech/mobile/going-hands-free-with-the-moto-x-and-new-droidsmartphones
https://www.pocket-lint.com/phones/news/motorola/123110-hands-on-motorola-skip-formoto-x-review/amp/
https://www.talkandroid.com/guides/beginner/how-to-automatically-disable-androidssecurity-lock-screen-when-connected-to-your-home-wi-fi-bluetooth-device-or-by-location/; https://web.archive.org/web/20140201074414/https://www.gsmarena.com/samsung_i9295_galaxy_s4_active-5446.php
https://www.youtube.com/watch?v=_FtNWYq12WY
https://web.archive.org/web/20140201074414/https://www.gsmarena.com/samsung_i9295_galaxy_s4_active-5446.php
https://web.archive.org/web/20140323194552/http://www.techradar.com/reviews/phones/mobilephones/samsung-galaxy-s4-active-1160411/review/6ffarticleContent
https://web.archive.org/web/20131223144050/https://play.google.com/store/apps/details?id=de.j4velin.delayedlock2&hl=en
https://www.talkandroid.com/guides/beginner/how-to-automatically-disable-androids-security-lockscreen-when-connected-to-your-home-wi-fi-bluetooth-device-or-by-location/
https://web.archive.org/web/20131108183642/http://www.techradar.com/reviews/phones/mobilephones/samsung-galaxy-s4-active-1160411/review/2#articleContent
https://web.archive.org/web/20131109210925/http://www.techradar.com/reviews/phones/mobilephones/samsung-galaxy-s4-active-1160411/review/9#articleContent
https://web.archive.org/web/20131031235157/http://www.techradar.com/reviews/phones/mobilephones/samsung-galaxy-s4-active-1160411/review#articleContent
https://www.youtube.com/watch?v=GWEyoS9JIXE
https://www.youtube.com/watch?v=urA48TfGuKo
https://www.youtube.com/watch?v=5j8aDmBvej8
https://web.archive.org/web/20140201011449/https://www.gsmarena.com/samsung_galaxy_note_3-5665.php
https://web.archive.org/web/20140221002031/http://www.anandtech.com/show/7376/samsunggalaxy-note-3-review/5
https://www.youtube.com/watch?v=nl9n3xlEnJA
https://web.archive.org/web/20140211200821/http://www.anandtech.com/show/7376/samsunggalaxy-note-3-review/7
https://web.archive.org/web/20140110163135/https://play.google.com/store/apps/details?id=com.benhirashima.skiplock
https://web.archive.org/web/20140209033258/http://www.cultofandroid.com/49082/app-weekskiplock-app-installed-every-android-device-review/
https://web.archive.org/web/20140101000954/http://benhirashima.com/posts/the-rebirth-of-unlockwith-wifi/
https://web.archive.org/web/20140102024635/http://benhirashima.com/skiplock/faq
Samsung Electronics, Co., Ltd., invalidity contentions, Jan. 27, 2023 Samsung P.R.3-3, Jan. 27, 2023.
Samsung Electronics, Co., Ltd., invalidity contentions, A_822 Final CCs (23 items), Jan. 27, 2023.
Samsung Electronics, Co., Ltd., invalidity contentions, B_929 Final CCs (24 items), Jan. 27, 2023.
Samsung Electronics, Co., Ltd., invalidity contentions, C_151 Final CCs (23 items), Jan. 27, 2023.
Samsung Electronics, Co., Ltd., invalidity contentions, D_098 Final CCs (23 items), Jan. 27, 2023.
Samsung Electronics, Co., Ltd., invalidity contentions, E_164 Final CCs (23 items), Jan. 27, 2023.
Samsung Electronics, Co., Ltd., invalidity contentions, F_133 Final CCs (23 items), Jan. 27, 2023.
Samsung Electronics, Co., Ltd., invalidity contentions, G_771 Final CCs (25 items), Jan. 27, 2023.
Samsung Electronics, Co., Ltd., invalidity contentions, H_MTC Finals (7 items), Jan. 27, 2023.
Samsung Electronics, Co., Ltd., invalidity contentions, I_SMI Finals (7 items), Jan. 27, 2023.
GT_I9300_UM_EU_Jellybean_Eng.
Android 4_0.
IPhone7_iOS10.
Surface_pro_4_user_guide_EN.
Bertino, Nov. 1, 2011, Location-Based Access Control Systems for Mobile Users (4 pages).
Notification of transmittal of the international search report and the written opinion (12 pages) dated on 11, 2015.
Samsung Electronics, Co., Ltd., invalidity contentions, J_SOTA INdex, Jan. 27, 2023.
WEB: https://support.apple.com/en-us/HT204380, Apple, iOS7, Face Time, 7 pages.
WEB: https://lifehacker.com/unlock-with-wifi-disables-your-password-protected-locks-5788727, Lifehaker, Disabling Password, 1 page.
https://web.archive.org/web/20070116051415/https://www.gsmarena.com/apple_iphone-1827.php
https://www.youtube.com/watch?v=r7fVWjgxRwk
https://web.archive.org/web/20230111060843/https://www.gsmarena.com/apple_iphone_3g-2424.php
https://manuals.info.apple.com/MANUALS/1000/MA1539/en_US/iPhone_iOS4_User_Guide.pdf
https://manuals.info.apple.com/MANUALS/1000/MA1622/en_US/iphone_iOS5_user_guide.pdf
https://www.techradar.com/reviews/phones/mobile-phones/google-nexus-one-665603/review
https://www.gsmarena.com/htc_google_nexus_one-3069.php
https://www.gsmarena.com/samsung_i7500_galaxy-2791.php
https://web.archive.org/web/20110818134659/http:/innovator.samsungmobile.com/bbs/tech/view.do?boardId=4&messageId=17461
https://www.samsung.com/uk/mobile-phone-buying-guide/samsung-phone-ranges-explained/
https://www.phonearena.com/news/Samsung-Galaxy-S-series-history-evolution_id78382
https://images.samsung.com/is/content/samsung/assets/global/ir/docs/2013_business_quarter04.pdf
https://web.archive.org/web/20130329203723/https://www.droid-life.com/2013/03/27/an-overview-of-android-lock-screen-security-options-beginners-guide/
https://www.talkandroid.com/reviews/phone/moto-x-review-finally-a-smartphone-with-features-that-matter/
https://www.gsmarena.com/motorola_moto_x-5601.php
https://www.youtube.com/watch?v=yRvOlkSELNI
https://www.anandtech.com/print/7235/moto-x-review
https://web.archive.org/web/20120721171016/http://benhirashima.com/unlockwithwifi/
https://web.archive.org/web/20110407065904/https://www.gsmarena.com/samsung_i897_captivate-3408.php
https://web.archive.org/web/20111104215926/https://www.mobiletechreview.com/phones/Samsung-Captivate.htm
https://web.archive.org/web/20130210092857/http://www.androidcentral.com/apps-week-eternity-warriors-2-chicken-bandit-espn-fantasy-football-and-more
https://www.appbrain.com/app/unlock-with-wifi-trial/com.benhirashima.unlockwithwifitrial
https://web.archive.org/web/20140205093444/http://benhirashima.com/posts/the-rebirth-of-unlock-with-wifi/
https://www.youtube.com/watch?app=desktop&v=5j8aDmBvej8
https://web.archive.org/web/20140131082015/http://www.anandtech.com/show/7376/samsung-galaxy-note-3-review
https://www.appbrain.com/app/skiplock/com.benhirashima.skiplock (56) References Cited

OTHER PUBLICATIONS https://web.archive.org/web/20111109101730/http://forum.xda-developers.com:80/showthread.php?t=955092
https://web.archive.org/web/20140107211847/https://www.talkandroid.com/guides/beginner/how-to-automatically-disable-androids-security-lock-screen-when-connected-to-your-home-wi-fi-bluetooth-device-or-by-location/
https://web.archive.org/web/20140323194552/http://www.techradar.com/reviews/phones/mobile-phones/samsung-galaxy-s4-active-1160411/review/6#articleContent
https://www.appbrain.com/app/delayed-lock/de.j4velin.delayedlock2.trial
https://www.semanticscholar.org/paper/Location-Based-Authentication-and-Authorization-Zhang-Kondoro/b854f83ab609af8ac44c08e92a98a61fd84090ce; http://kth.diva-portal.org/smash/get/diva2:576463/FULLTEXT01

* cited by examiner

ELECTRONIC APPARATUS AND METHOD OF SELECTIVELY APPLYING SECURITY MODE IN MOBILE DEVICE

CROSS-REFERENCE TO RELATED APPLICATIONS

This U.S. non-provisional patent application is a divisional application under 35 U.S.C. § 120 of a divisional application Ser. No. 18/088,671, filed Dec. 26, 2022, which is a divisional application Ser. No. 17/524,823, filed Nov. 12, 2021, Now U.S. Pat. No. 11,553,072, which is a divisional application Ser. No. 16/679,181, filed Nov. 9, 2019, Now U.S. Pat. No. 11,184,771, which is a divisional application Ser. No. 16/402,275 filed May 3, 2019, Now U.S. Pat. No. 10,511,975, which is a divisional application of a U.S. non-provisional application Ser. No. 16/166,078 filed Oct. 20, 2018, now U.S. Pat. No. 10,299,133, which is a divisional application of a U.S. non-provisional application Ser. No. 16/127,286 filed on Sep. 11, 2018, now U.S. Pat. No. 10,149,164, which is a continuation application of a U.S. non-provisional application Ser. No. 15/984,375 filed on May 20, 2018, now U.S. Pat. No. 10,085,151 which is a continuation application of a US non-provisional application Ser. No. 15/972,135 filed on May 5, 2018, now U.S. Pat. No. 10,111,098, which is a divisional application of a US non-provision patent application Ser. No. 15/853,870 filed on Dec. 25, 2017, now U.S. Pat. No. 9,973,929, which is a continuation application of U.S. non-provisional application Ser. No. 15/297,069, filed on Oct. 18, 2016, now U.S. Pat. No. 10,064,056, which is a continuation-in-part application of U.S. non-provisional patent application Ser. No. 14/181,728, filed on Feb. 17, 2014, now U.S. Pat. No. 9,509,822, in the U.S. Patent and Trademark Office, the entire contents of which are hereby incorporated by reference.

BACKGROUND OF THE INVENTIVE CONCEPT

1. Field of the Inventive Concept

The present inventive concept relates to an electronic apparatus and method of selectively applying a security mode in a mobile device.

2. Description of the Related Art

A conventional electronic mobile device, for example, a cellular phone, is set to a security mode or a non-security mode. When the set security mode is set, a user has to input a security code by enter a password, an image, or a geniture though a user interface unit. That is, a user has to input the security code every time to access the mobile device set with the security mode.

Even if a user is in a security safe zone, the user has to enter the security code previously set in the security mode. In order for the user to avoid inconvenience in the security safe zone, a user has to disable the security mode to avoid any inconvenience to enter the security code, and then later enable the security mode.

Moreover, since the mobile device is accessed only with the security code set in the security mode, no one is allowed to access the mobile device without the set security code. That is, a person having a high priority or authorization to access the mobile device cannot access the mobile device of a person having a lower priority or authorization.

SUMMARY OF THE INVENTIVE CONCEPT

The present inventive concept provides an electronic apparatus to selectively apply a security mode in a mobile device.

The present inventive concept provides a method of selectively applying a security mode in a mobile device.

The present inventive concept provides a computer readable medium to contain computer readable codes as a program to execute a method of selectively applying a security mode in a mobile device.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing a non-transitory computer-readable medium containing codes as a program to perform a method of a mobile device to photograph an object, the method including controlling a panel to display an image and to receive a user input, and controlling a network interface to wirelessly communicate with an external network comprising an access point, unlocking the mobile device according to an area condition and a wireless communication condition comprising a wireless communication with the external network when the mobile device is in a time condition, and unlocking the mobile device according to a password when the mobile device is not in the time condition.

The time condition may include a period of time.

The unlocking the mobile device may further include changing the mobile device to a normal mode.

The unlocking the mobile device may further include changing the mobile device from a power saving mode to a normal mode.

The area condition may include an area defined by a line on a diagram.

The area condition may include an area in which the mobile device is disposed.

The area condition may include a house in which a user of the mobile device stays.

The area condition may include a house in which the access point is located.

The access point may further include a wireless access point.

The access point may further include a wireless access point connecting to a wired network.

The access point may further include a wireless access point connecting to a wired network using a WIFI standard.

The external network may further include a carrier service station.

The external network may further include a home appliance being an apparatus to communicate with the mobile device to transmit and receive data.

The method may further include unlocking the mobile device when the mobile device is in the area condition and the wireless communication condition and when the mobile device is in the time condition.

The method may further include unlocking the mobile device according to the password when the mobile device is not in at least one of the area condition and the wireless communication condition, when the mobile device is in the time condition.

The method may further include setting the area condition and the wireless communication condition according to a second user input.

The method may further include displaying a screen comprising a menu to set the area condition and the wireless communication condition according to a second user input.

The mobile device may further include a user menu area displaying one or more menus selectable by a user finger to set at least one of the area condition and the wireless communication condition, the user menu area comprises a user finger reachable area and a user finger unreachable area. The method may further include displaying the one or more menus at the user finger reachable area of the user menu area such that the user finger of a user hand holding the mobile device reaches the one or more menus to set the at least one of the area condition or the wireless communication condition.

The mobile device may further include a user menu area displaying one or more menus selectable by a user finger for a second user input to set at least one of the area condition and the wireless communication condition. The user menu area may further include a user finger reachable area and a user finger unreachable area. The method may further include displaying the one or more menus at the user finger reachable area such that the user finger of a user hand holding the mobile device reaches the one or more menus to set the at least one of the area condition or the wireless communication condition without assistance of other user fingers.

The mobile device may further include a user menu area displaying one or more menus selectable by a user finger for a second user input to set at least one of the area condition and the wireless communication condition. The user menu area may further include a line defining a user finger reachable area and a user finger unreachable area. The method may further include displaying the one or more menus at the user finger reachable area such that the user finger of a user hand holding the mobile device reaches the one or more menus to set the at least one of the area condition or the wireless communication condition.

The method may further include setting the area condition after the wireless communication condition has been set.

The method may further include displaying a password-input menu to receive the password when the area condition is set.

The method may further include displaying a password-input menu to receive the password when the area condition is edited.

The mobile device may further include a switch. The method may further include unlocking the mobile device according to the area condition and the wireless communication condition when the mobile device is in the time condition, in response to a selection of the switch.

The mobile device further comprises a switch, and the method may further include unlocking the mobile device according to the password when the mobile device is not in the time condition, in response to a selection of the switch.

The mobile device may further include a switch, and the method may further include unlocking the mobile device according to the password when the mobile device is not in at least one of the area condition and the wireless communication condition and when the mobile is in the time condition, in response to a selection of the switch.

The mobile device may further include a sensor to detect a motion of the mobile device, and the method may further include unlocking the mobile device according to a user image when the mobile is in the time condition, in response to the detected motion of the mobile device.

The method may further include performing the wireless communication with the external network for data transmission through an Internet.

The method may further include unlocking the mobile device according to a motion of the mobile device when the mobile device is in the time condition.

The method may further include unlocking the mobile device according to a user image when the mobile device is in the time condition.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

Figure 1:
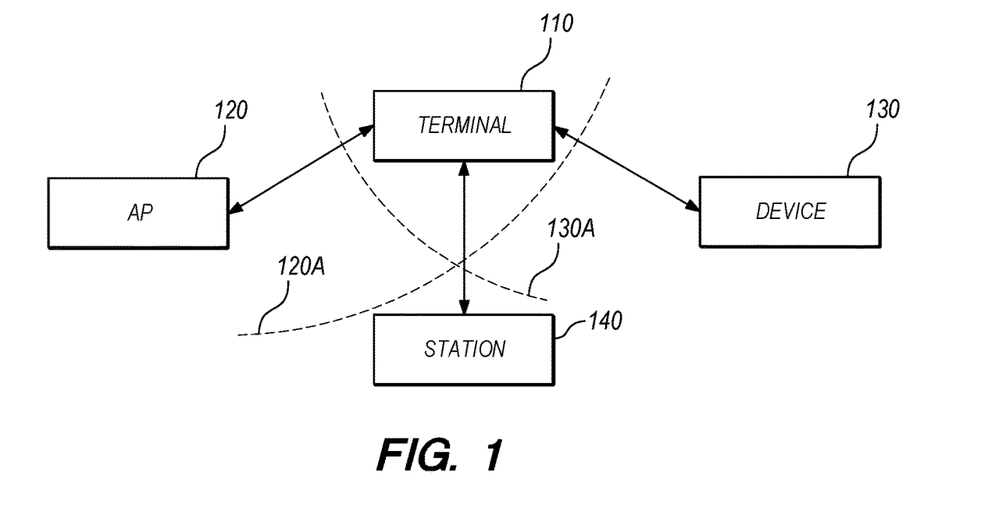
FIG. 1 is a block diagram illustrating an electronic terminal to communicate with external devices according to an embodiment of the present inventive concept.

FIG. 1 illustrates an electronic terminal apparatus 110 to communicate with one or more external apparatuses according to an embodiment of the present inventive concept. The electronic terminal apparatus 110 may be a computer apparatus, a portable personal computer, a mobile electronic device, a mobile phone, a mobile tablet apparatus, a mobile tablet computing apparatus, an audio or video recording and/or reproducing apparatus, a photographing apparatus, a communication device, etc.

The external apparatus may be an access point (AP) 120 such as a wireless access point device to connect to a wired network using WiFi, WiFi direct, or related standards, a device 130 such as a Bluetooth device or radio frequency identification (RFID) device, etc, and a station 140 for wireless communication such as a carrier service station for 4G, LTE, etc. However, the present general inventive concept is not limited thereto. It is possible that the external apparatus may be another electronic apparatus. It is also possible that the external apparatus may be an apparatus to communicate with the terminal 110 to transmit and receive data therebetween, and such an apparatus may be a home appliance, such as a refrigerator or air conditioner.

The terminal 110 may be disposed within an area defined by a line 120A distanced from the AP 120 or an area defined by a line 130A distanced from the device 130. The terminal 110 may communicate with the AP 120 using the AP-related technology when being disposed within the area defined by the line 120A, and may also communicate with the device 130 using the device-related technology when being disposed within the area defined by the line 130A.

The terminal 110 may have menus and/or functions to correspond to data (signal) of the AP 120, the device 130, and the station 140. The terminal 110 may have menus and functions to correspond to data (signal) stored in a storage unit of the terminal 110.

Figure 2:
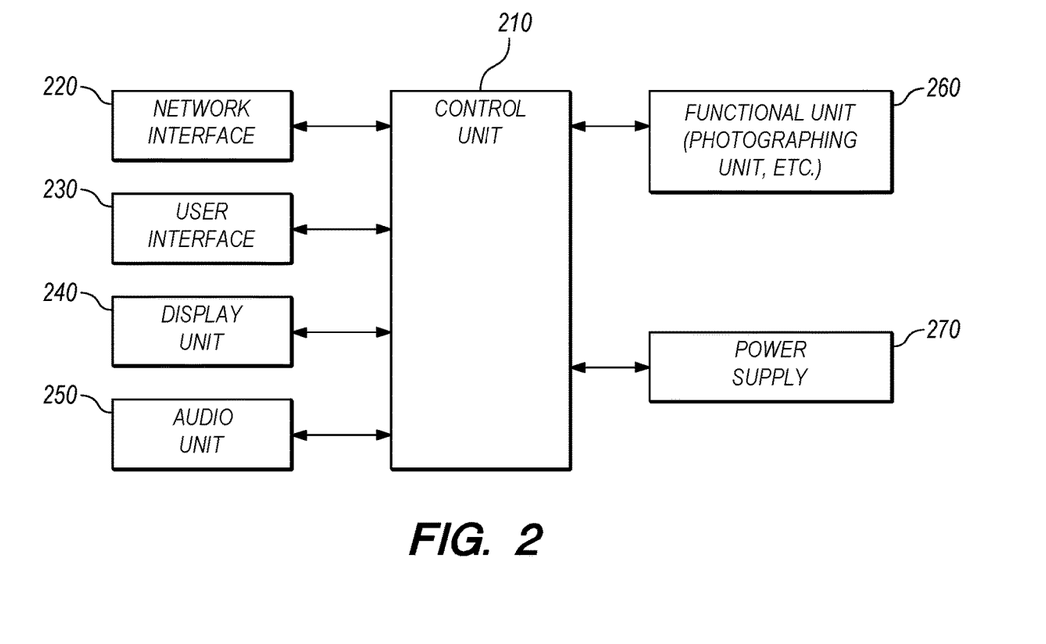
FIG. 2 is a diagram illustrating an electronic terminal according to an embodiment of the present inventive concept.

FIG. 2 illustrates a block diagram of an electronic terminal according to an embodiment of the present inventive concept. The terminal may include a control unit 210, a network interface 220, a user interface 230, a display unit 240, an audio unit 250, one or more functional unit 260, a power supply unit 270 including a battery and a battery charging unit. The above components may be disposed in or on a housing of the terminal.

The control unit 210 may control operations of the terminal and may include a data storage unit, for example, a semiconductor memory unit. The control unit 210 may be connected to an external data storage unit disposed in the housing. The housing of the terminal may include a port such that another external data storage can be detachably attached to the port of the housing, and the port may be connected to the control unit 110 to transmit and receive data.

The network interface unit 220 may communicate with an external network apparatus, for example, the AP 120, the device 130, and the station 140 which are illustrated in FIG. 1.

The user interface unit 230 may receive a user input to control operations of the terminal. The user interface unit 230 may include a physical button or key board such as QWERTY keyboard. The user interface unit 230 may have a sensor to detect a user gesture as a user input. The user interface unit 230 may include a microphone to detect a user voice as a user input. The user interface unit 230 may be a sensor to detect an image as a user input. The display unit 240 may include a screen to display an image corresponding to operations of the terminal. The display unit 240 may include a panel or a touch screen to perform a function to display an image and also a function to receive a user input. The user interface unit 230 and the display unit 240 may be formed as a single integrated body. The audio unit 250 may be a speaker and/or a microphone.

The functional unit 260 may be a photographing unit to photograph an object and to generate a signal corresponding to the photographing object. The signal may be processed in the control unit 210, displayed in the display unit 240, and/or transmitted to the external apparatus through the network interface unit 220.

The power supply unit 270 may be connectable to an external power source using a wired and/or wireless method.

The control unit 210 is configured to selectively perform a security mode according to a condition set by a user when the terminal receives a user input corresponding to a power-on, an activation mode in response to a deactivation mode, a wake-up mode in response to a sleep mode, and/or a normal mode in response to a power-saving mode. The activation, wake-up, and normal mode may be usable as a common function of the terminal or may be usable differently, according to a design or user preference. The condition may be a safe zone condition in a security mode or may be a non-safe zone in a non-security mode, for example. After the condition is set in a normal mode of the terminal, the terminal is changed to the deactivation mode (the sleep mode or the power-saving mode) a predetermined time after the normal mode or a predetermined time after no user input. And then the terminal provides a process for the security mode or does not provide the process for the security mode according to the condition when being changed to the activation mode (wake-up mode or the normal mode) according to the user input.

FIGS. 3A-3D illustrating an electronic terminal 300 formed with a display unit and a user interface unit to display screens 300A-300D corresponding to operations of the electronic terminal 300 according to an embodiment of the present inventive concept.

Figure 3A:
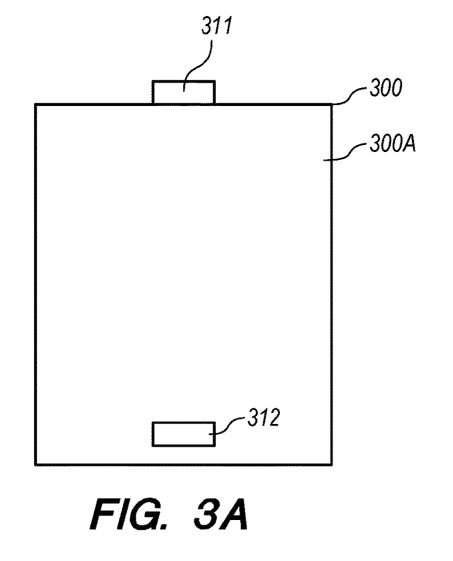
FIGS. 3A-3D are views illustrating an electronic terminal with a display unit and a user interface unit according to an embodiment of the present inventive concept.

As illustrated in FIG. 3A, the screen 300A of the terminal 300 A does not show an image according to a deactivation mode, a sleep mode, or a power saving mode. The terminal 300 may have a power switch 311 and a switch 312 as a user input. The power switch 311 may be usable to turn on and off the terminal, and the switch 312 may be usable to change a mode of the terminal 300, that is, to change from the deactivation mode, the sleep mode, or the power saving mode to an activation mode, a wake-up mode, or a normal mode. The switch 312 may be a sensor to detect a motion of the terminal 300 or to detect a motion (image) of a user as a user input.

Figure 3B:
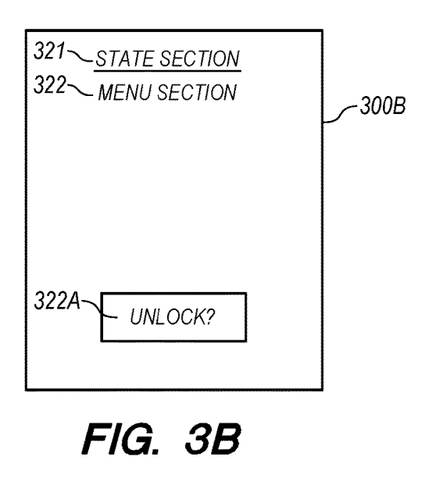

When the switch 312 of FIG. 3A is selected, the screen 300B of FIG. 3B may be displayed on a display unit to unlock or select a security process to access the terminal 300 in a security mode. The screen 300*b* may include a state section 321 and a menu section 322. The state section 321 may include a communication state with the AP 120, the device 130, and/or the station 321 of FIG. 1, and may also include other states corresponding to operations or functions set in the terminal 300 or environment around the terminal 300. The other states may include a time display or a battery state display, a temperature state display, a weather state display, etc. When the terminal 300 is in a power-on state, the terminal monitors, detects, determines, and/or performs communications with external devices to correspond to the above-described states of the state section 321.

Figure 3C:
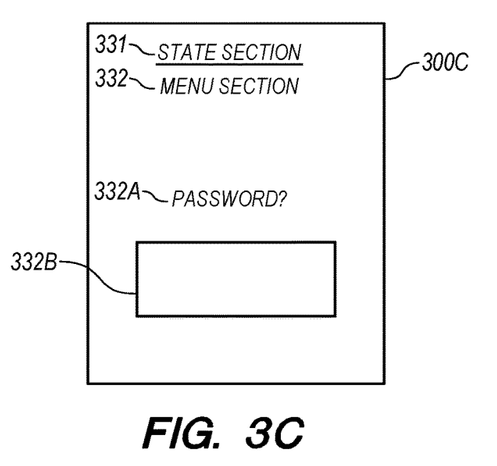
Figure 3D:
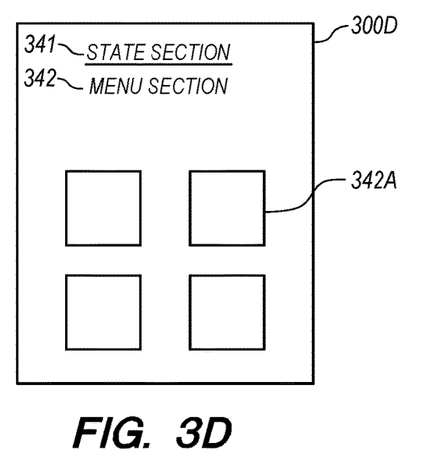

When a menu 322A to unlock the terminal 300 is selected from the screen 300*b*, the screen 300C is displayed to show a security check process, for example, a password input process, as illustrated in FIG. 3C. The screen 300C may include a state section 331 and a menu section 332 having a password indication section 332A and a password input section 332B. When a password input by the user through the password input section 332B is identical to a password previously stored therein, the terminal 300 displays the screen 300D to show a state section 341 and a menu section 342 with menus (or icons) 342A.

When a first predetermined condition is set in the terminal 300 as a safe zone in a security mode (password setting mode), the screen 300A is changed to the screen 300D without displaying the screens 300B and 300C when the first predetermined condition is met. When the first predetermined condition is not met, the terminal displays the screens 300B and 300C to require a security process to enter a password. When a second predetermined condition is set in the terminal 300 as a non-safe zone in a non-security mode (no password setting), the terminal displays the screens 300A, 300B, 300C, and 300D to normally access the terminal when the second predetermined condition is met. When the second predetermined condition is not met, the terminal 300 may not display the screens 300B and 300C.

The state section 341 of the screen 300D may include an image corresponding to the safe zone and/or the non-safe zone according to the security mode and/or non-security mode, respectively. The state section 341 may not be selectable by a user as a user input. The menu section 342 of the screen 300D may include one or more menus 342A selectable by a user as a user input to perform a function or operation of the terminal 300. The menu section 342 of the screen 300D may include a settings menu (icon) to set the security mode, the non-security mode, the safe zone, and/or the non-safe zone, etc.

Figures 4, 5:
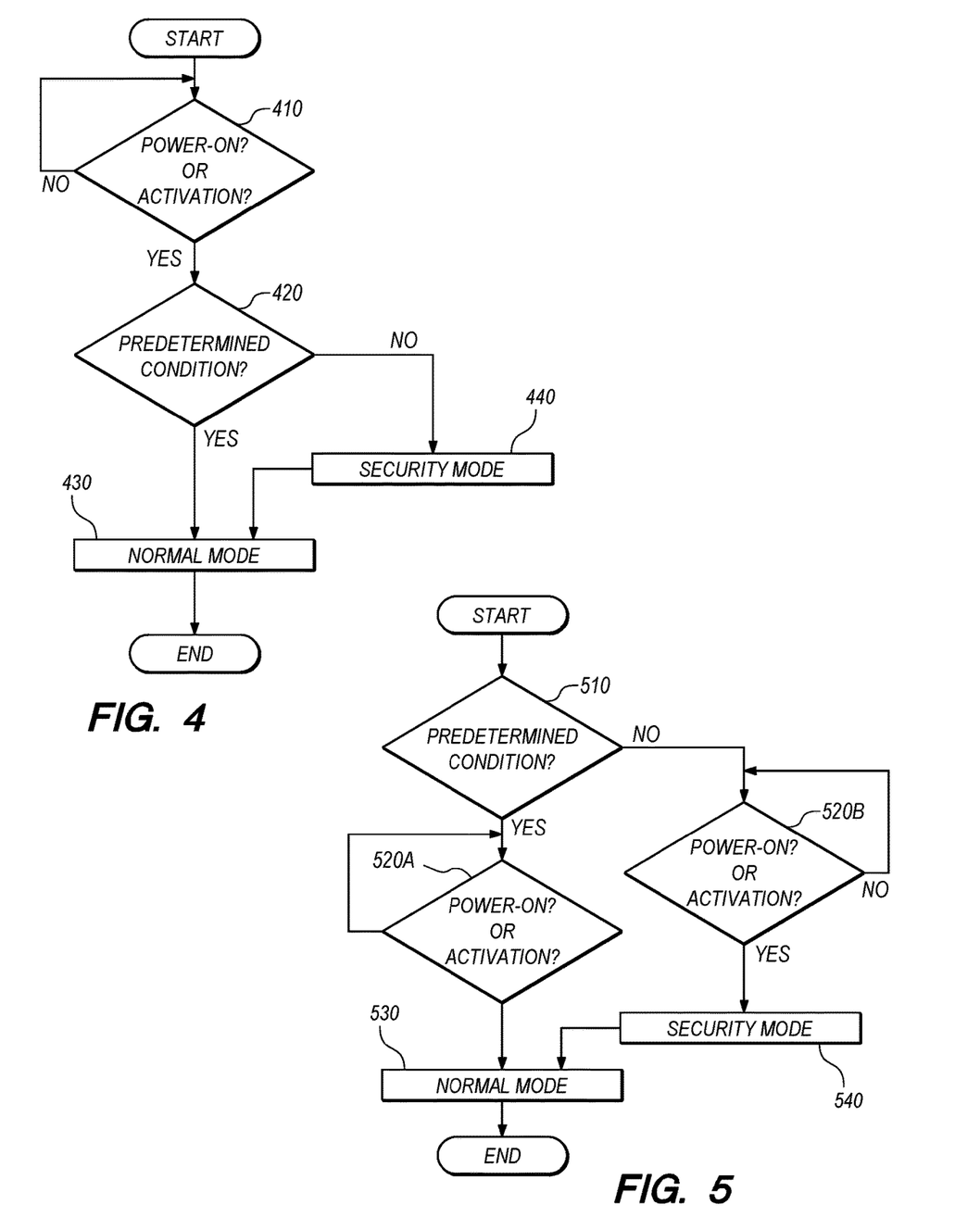
FIG. 4 is a flowchart illustrating a method of selectively applying a security process in a mobile device according to an embodiment of the present inventive concept.
FIG. 5 is a flowchart illustrating a method of selectively applying a security process in a mobile device according to an embodiment of the present inventive concept.

FIG. 4 illustrates a method of selectively applying a security mode in a mobile device according to an embodiment of the present inventive concept.

A power-on or activation switch is on in operation 410, a control unit of the mobile device determines whether a predetermined condition is met in operation 420. When the predetermined condition is met, that is, the mobile device is in a safe zone, the mobile device operates a normal mode in operation 430 such that a user can access the mobile device. When the predetermined condition is not met in operation 420, that is, the mobile device is not in the safe zone, the mobile device requires a user to enter a password in operation 440 to authorize the user to access of the mobile device.

FIG. 5 illustrates a method of selectively applying a security mode in a mobile device according to an embodiment of the present inventive concept A predetermined condition is set in the mobile device in operation 510. When an activation switch is selected in operations 520A or 520B, a security mode is not performed to enter a normal mode in operation 530 or the security mode is performed in operation 540 when the predetermined condition is not met in operation 510. That is, the mobile device selectively performs the security mode according to selection of an activation switch as a user input. The mobile device selectively requires a user to perform the security mode. For example, when the mobile device is in a safe zone according to the predetermined condition, the user is not required to process the security mode to enter a password. However, the mobile device is not in the safe zone according to the predetermined condition, the user is still required to process the security mode to enter a password. Here, the password may be a character, number, motion, audio, and/or image.

Figure 6A:
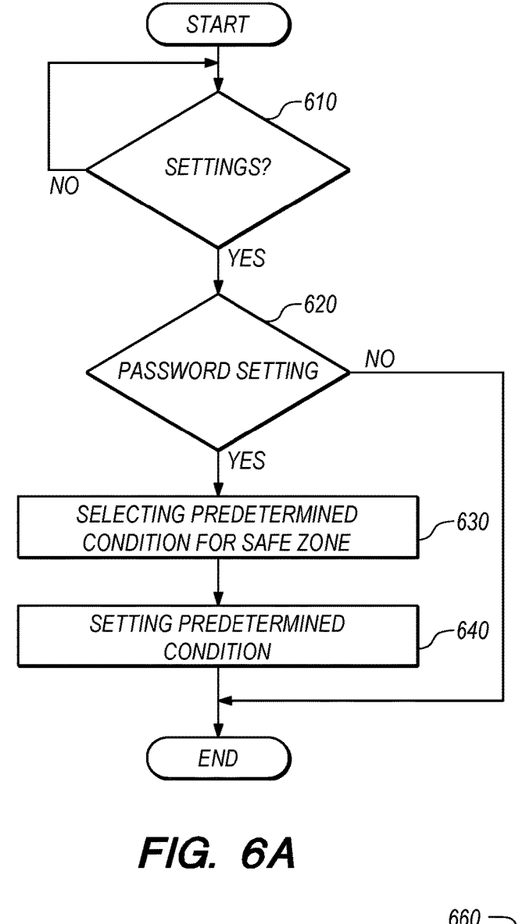
FIG. 6A is a flowchart illustrating a method of setting a condition for a safe zone in a password setting mode of a mobile device according to an embodiment of the present inventive concept.

FIG. 6A illustrates a method of setting a condition for a safe zone in a password setting mode of a mobile device according to an embodiment of the present inventive concept A user selects a settings menu in operation 610, and then selects a password setting menu in operation 620 to set the mobile device as a security (password setting) mode or a non-security (no-password setting) mode.

A predetermined condition for a safe zone is selected in operation 630, and then is set in operation 640.

Figure 6B:
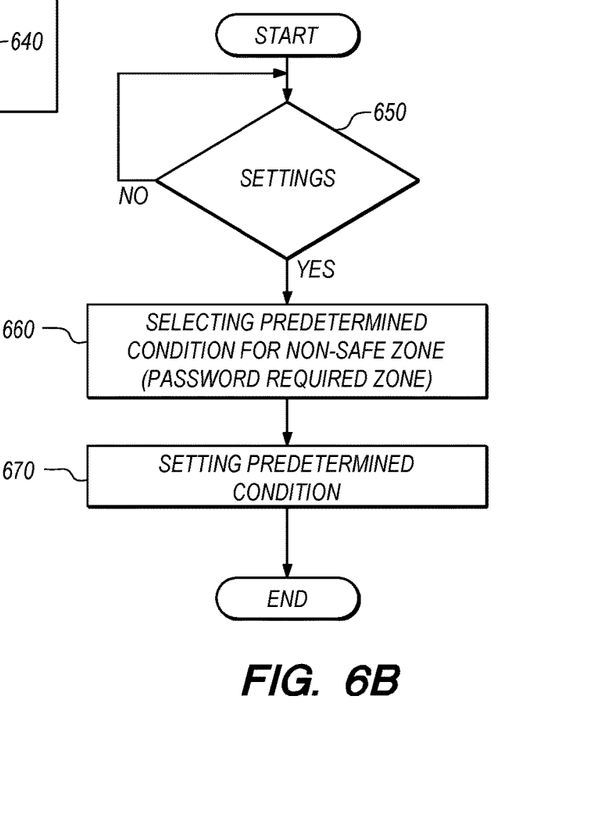
FIG. 6B is a flowchart illustrating a method of setting a condition for a non-safe zone in a non-password mode of a mobile device according to an embodiment of the present inventive concept.

FIG. 6B illustrates a method of setting a condition for a non-safe zone in a non-password mode of a mobile device according to an embodiment of the present inventive concept.

When a user selects a non-security (no-password setting) mode or does not set a security mode in the settings menu in operation 650, the settings menu may further include a menu to select a non-safe zone (or password-required zone) in operation 660. The predetermined condition can be set in operation 670 such that the mobile device monitors a current condition thereof to determine whether the current condition meets the predetermined condition. When the predetermined condition is met, the mobile device requires the user to enter a password to access the mobile device in the non-security mode of the mobile device. When the predetermined condition is not met, the mobile device does not require the user to enter the password in a similar manner to the non-security mode.

FIGS. 7A through 7I illustrate screens 700A through 700I of a mobile device to set a condition for a safe zone of a security mode or a non-safe zone of a non-security mode according to an embodiment of the present inventive concept.

Figure 7A:
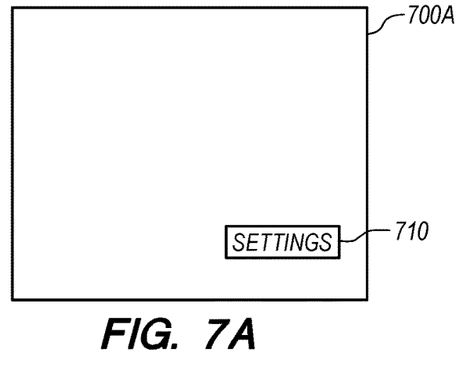
FIGS. 7A through 7I are views illustrating screens of a mobile device to set a condition in a mobile device according to an embodiment of the present inventive concept.
Figure 7B:
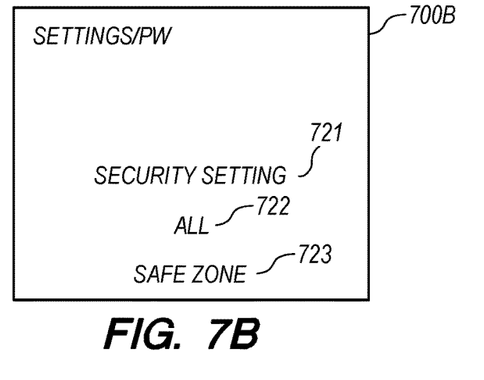

When a settings menu (button or icon) 710 is selected in the screen 700A of the mobile device as a user input in FIG. 7A, the screen 700B of FIG. 7B is displayed on a display unit and/or user input unit of the mobile device to show a selection of "security setting" 721 to set a security (password) as a security mode, a selection of "all" 722 to apply the security mode to all functions or operations of the mobile device, and a selection of a "safe zone" 723 to prevent the security mode in a predetermined condition. It is possible that the selection of "all" 722 and selection of "safe zone" 723 may be displayed in a separate screen from a screen of the security setting 721, that is, the selection of "all" 722 and selection of "safe zone" 723 may be displayed, performed, or selected independently after the security setting 721 is performed to set the security mode.

Figure 7C:
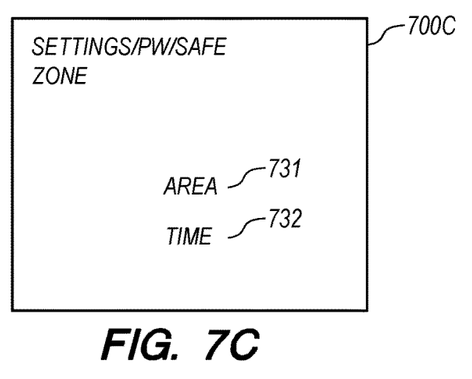

When a menu of the safe zone 723 is selected, the screen 700C is displayed to show an area menu 731 and/or a time menu 732 as the predetermined condition. It is possible that both the area menu 731 and the time menu 732 can be selected and set as the predetermined condition. It is also possible that only one of the area menu 731 and the time menu 732 can be selected and set as the predetermined condition.

When the time menu 732 is selected, a specific time or a time period is set as the safe zone, using a new screen. Setting a specific time or a time period is well known, detail descriptions thereof will be omitted. When the time menu is performed to set the predetermined condition of the safe zone, the mobile device releases the security mode at the specific time or during the time period such that the user can access the mobile device without the security process according to the set time menu.

Figure 7D:
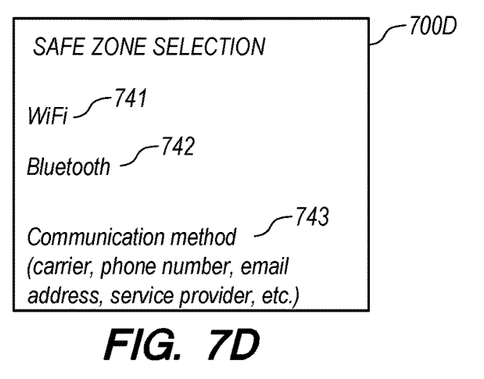

When the area menu 731 is selected, one or more area settings are displayed on the screen 700D of FIG. 7D. The one or more area settings may include a WiFi selection menu 741, a Bluetooth selection menu 742, and a communication method selection menu 743.

Figure 7E:
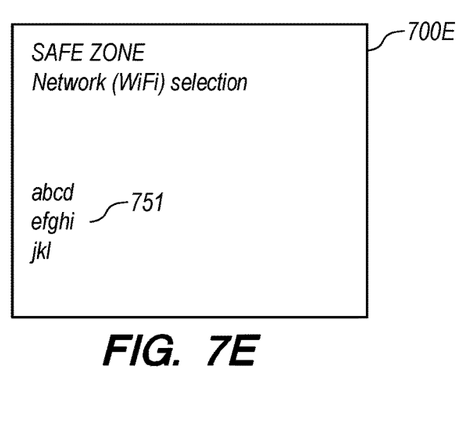

When the WiFi menu 741 is selected, at least one WiFi network 751 can be input, detected and then displayed, or selected as a safe zone in the screen 700E of FIG. 7E. When a user with a mobile device stays in a house of the user, for example, and an AP is located as a home use inside the house of the user, the AP as a home use may be reliable network and environment to the user and thus the home AP can be set as a safe zone. In this case, the user does not have to enter a password every time to activate or access the mobile device within an accessible area of the AP and/or inside the house. However, when a user with a mobile device stays away from the AP, the mobile device requires the user to enter the password since the predetermined condition is not met or the mobile device cannot communicate with the AP or lost a signal from the AP.

Figure 7F:
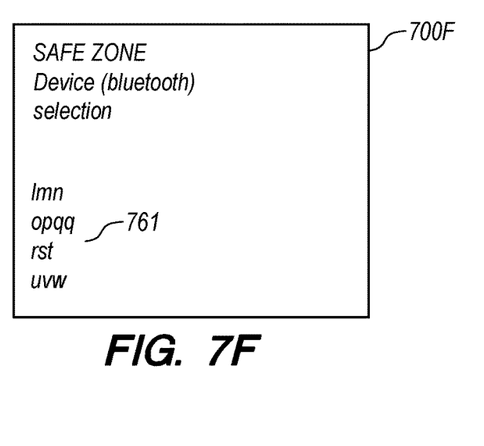

When the Bluetooth (device) is selected, at least one device 761 can be input, detected and then displayed, or selected as a safe zone in the screen 700f of FIG. 7F. When a user with a mobile device is in a vehicle owned by the user, for example, the Bluetooth and/or the vehicle may be reliable network and environment to the user and thus the device can be set as a safe zone. In this case, the user does not have to enter a password every time to activate or access the mobile device within an access area of the device, that is, within an inside of the vehicle.

It is possible that when a user vehicle is set as the device or the AP for the safe zone and when a signal indicating an emergence, for example, traffic collision or accident to the vehicle, is generated from the vehicle and then transmitted to the mobile device through the Bluetooth or WiFi, the mobile device can recognize the received signal as a predetermined condition of a safe zone so that the user can access and/or use the mobile device without entering a password in the security mode of the mobile device. Here, the vehicle and the mobile device are configured to recognize the signal as a portion of the predetermined condition of a safe zone. In this case, a combination of the selected device and a specific or predetermined signal from the selected device can be set as the safe zone of the mobile device, and when the mobile device receives the signal from the device, so that the user can access or use the mobile device without performing a security check process in a security mode of the mobile device.

It is also possible that when a user medical device is set as the device or the AP for the safe zone and when a signal indicating an emergence for example, a life threatening situation or accident to the user, is generated from the medical device and then transmitted to the mobile device through the Bluetooth or WIFi, the mobile device can recognize the received signal as a predetermined condition of a safe zone so that the user can access and/or use the mobile device without entering a password in the security mode of the mobile device. Here, the medical device and the mobile device are configured to recognize the signal as a portion of the predetermined condition of safe zone. In this case, a combination of the selected device and a specific or predetermined signal from the selected device can be set as a predetermined condition of the safe zone of the mobile device, and when the mobile device receives the signal from the device, so that the user can access or use the mobile device without performing a security check process in a security mode of the mobile device.

Figure 7G:
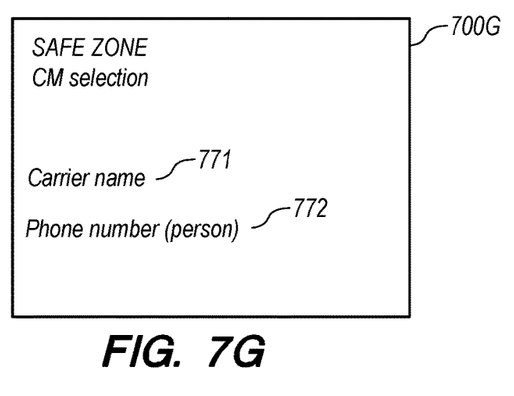

When the communication method 743 is selected, one or more communication methods (CMs) 771 and 772 can be selected and set as a safe zone on the screen 700g of FIG. 7G. In this case, a carrier name 771 and/or telephone number 772 can be reliable to the user. That is, when the user communicates with the person of the telephone number 772 and the carrier name 771, the user does not have to enter a password to use the mobile device.

Figure 7H:
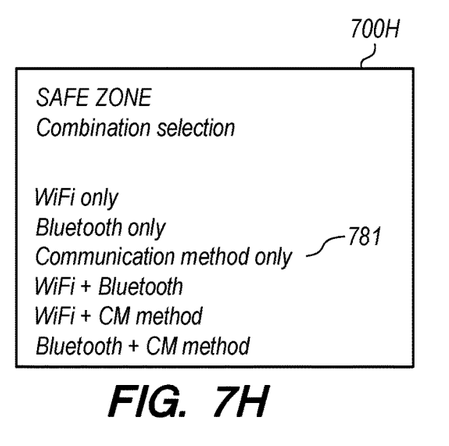
Figure 7I:
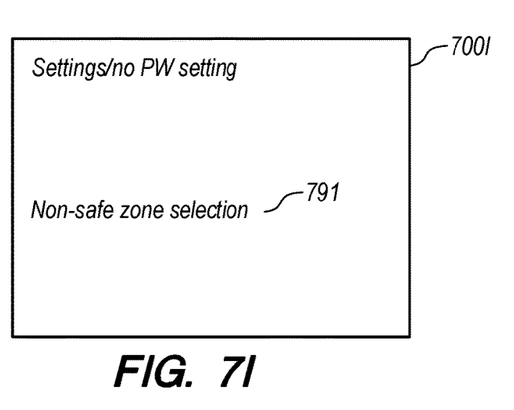

In the screen 700H of FIG. 7H, at least one or a combination of the Wifi, Bluetooth, and communication method can be selected and/or set in a menu 781 as safe zone.

When the security mode is not selected or set in the settings menu 710 of the screen 700a, a menu 791 of non-safe zone can be selected and set such that the mobile device is set to perform a security mode in a non-security mode of the mobile device. For example, an AP, a device, or a communication method is set as the non-safe zone using one or more non-safe zone selection processes similar to the safe zone selection processes of FIGS. 7D through 7H.

Figure 8A:
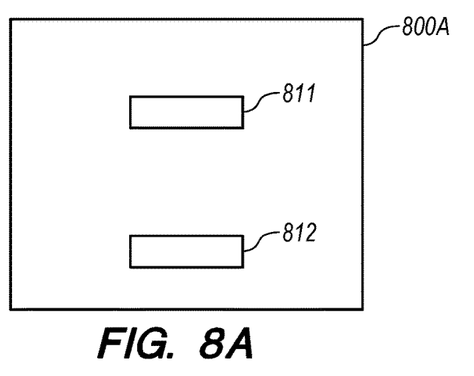
FIGS. 8A through 8F are views illustrating screens of a mobile device to perform operations in a safe zone and in a non-safe zone according to an embodiment of the present inventive concept.
Figure 8B:
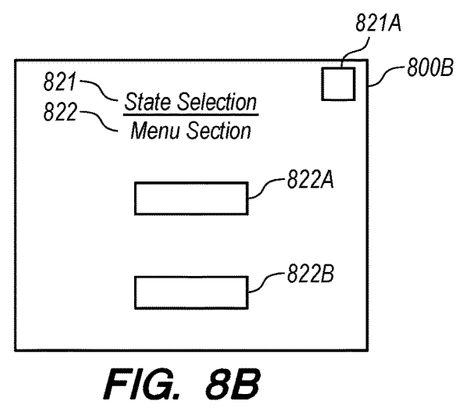

FIGS. 8A through 8F illustrate screens 800a through 800f of a mobile device to perform operations in a safe zone and in a non-safe zone according to an embodiment of the present inventive concept FIG. 8A illustrates the screen 800A, a power on/off switch 811, and an activation switch 812. FIG. 8B illustrates the screen 800b including a state section 821 and a menu section 822. The state section 821 may be similar to the state section 321, 331, and 341 of FIGS. 3B, 3C and 3D. The state section 821 may include a state indicator 821A to indicate a predetermined state and/or a safe zone in a security mode. The states displayed on the state section 821 may not be selectable by a user as a user input. The menu section 822 may include one or more menus 822A and 822B which are displayable on a display unit and/or selectable by a user as a user input.

Figure 8C:
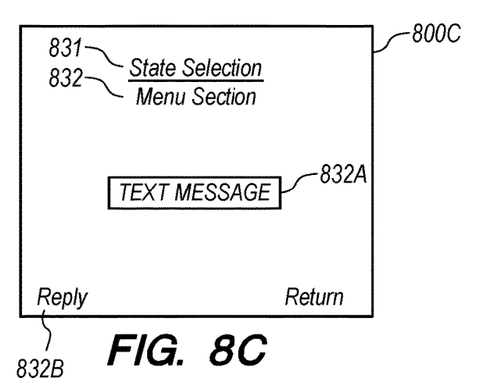
Figure 8D:
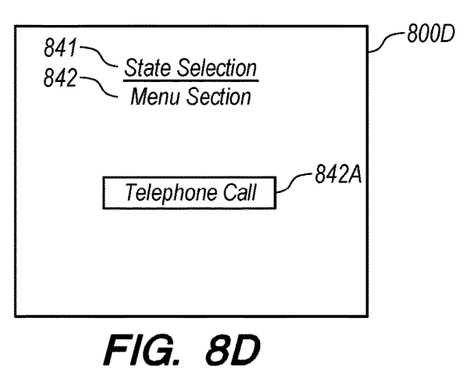

When a current condition matches the predetermined condition as the safe zone, the mobile device displays the screen 800B by skipping a security mode process. It is possible that the mobile device can display on the screen 800C with a state section 831 and a menu section 832 including a text message 832A and selection menus 832B relating to the displayed text 832A when the mobile device receives the test message 3832A. It is also possible that the mobile device can display on the screen 800D with a state section 841 and a menu section 842 including a telephone call message 842A including selection menus relating to the telephone call message 842A when the mobile device receives the telephone call such that the user can access and use the mobile device.

Figure 8E:
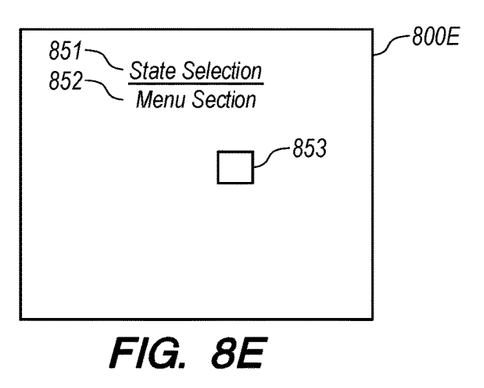
Figure 8F:
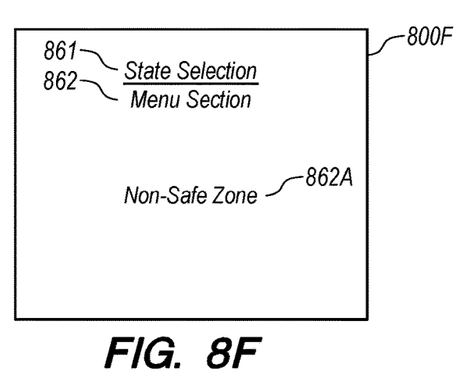

The screen 800E of FIG. 8E illustrates a state section 851 and a menu section 852 including at least one menu 853. The screen 800E may be displayed when a password is entered in a security (password-setting) mode, when a predetermined condition of a safe zone is met in the security mode, or when a password is entered in a non-security mode and in a non-safe zone. The menu 853 may be a settings menu to select, change, or modify settings of the mobile device. In this case, it is possible that the mobile device may require the user to enter a password to select, change, or modify settings when the screen 800E is displayed when a predetermined condition of a safe zone is met in the security mode and accordingly a security mode is not preformed.

Figure 9:
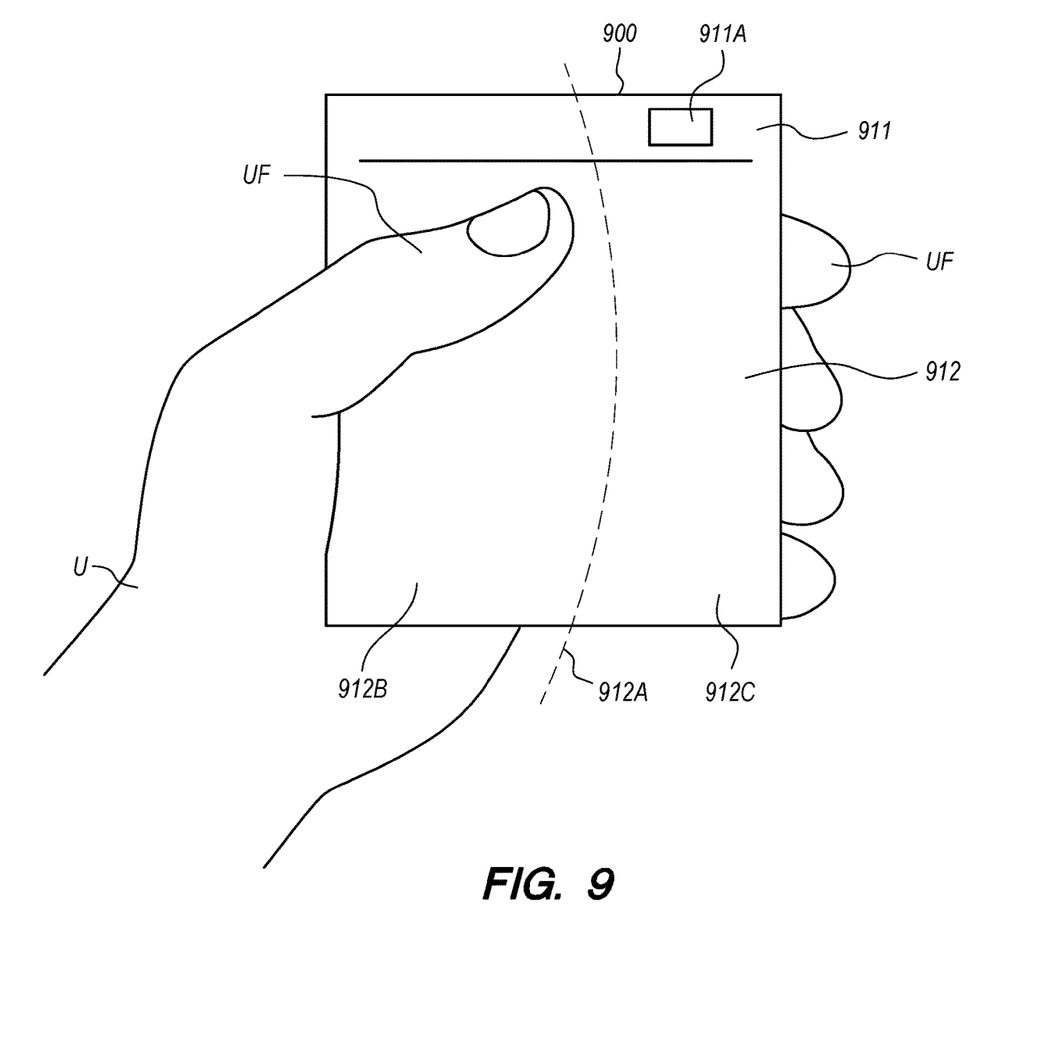
FIG. 9 is a view illustrating a mobile device to display a user input menu within a user finger-reaching area according to an embodiment of the present inventive concept.

FIG. 9 illustrates a mobile device 900 to display a state section 911 and a user menu section 912 according to an embodiment of the present general inventive concept. A user U holds the mobile device 900 using one hand. At least one of user fingers UF of the user one hand can be usable to select a menu to input a user input. The user menu section 912 may include a user menu area 912B and a non-user menu area 912C which are defined by a line 912A to be a user-finger reachable area and a user-finger unreachable area, respectively. One or more menus or images displayed within the user menu area can be selectable by a user using a finger without assistance of the other hand finger, and one or more menus or images displayed within the non-user menu area 912C may not be reachable selectable by the user using the same finger. It is possible that the non-user menu area 912C may not include a menu to be selectable by a user as a user input. Accordingly, a user can control the mobile device with one hand.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As illustrated above, a mobile device can be set in a security mode and a safe zone may be set in the security mode so that the mobile device does not require a user to enter a password when a current condition matches a predetermined condition of the safe zone.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A non-transitory computer-readable medium containing codes as a program to perform a method of a mobile device including a display unit having a panel and a photographing unit to photograph an object, the method comprising:
controlling the panel to display one or more menus and to receive a user input, and controlling a network interface to detect an external device,
determining whether the mobile device is in a time condition;
sensing a motion of the mobile device by using a sensor;
applying a first security mode of receiving a password through the panel to unlock the mobile device in response to the sensed motion, according to the determination that the mobile device is not in the time condition; and
applying a second security mode without receiving the password to unlock the mobile device in response to the sensed motion, according to the determination that the mobile device is in the time condition.

2. The medium of claim 1, wherein the method further comprises applying the first security mode when the second security mode fails.

3. The medium of claim 1, wherein the time condition comprises a period of time.

4. The medium of claim 1, wherein:
the panel comprises a user finger reachable area and a user finger unreachable area; and
the method further comprises displaying the one or more menus in the user finger reachable area such that the user finger of a user hand holding the mobile device reaches the one or more menus.

5. The medium of claim 1, wherein:
the panel comprises a user finger reachable area and a user finger unreachable area; and
the method further comprises displaying a user menu to set the second security mode in the user finger reachable area such that the user finger of a user hand holding the mobile device reaches the user menu.

6. The medium of claim 1, wherein:
the panel comprises a user finger reachable area and a user finger unreachable area; and
the unlocking the mobile device further comprises unlocking the mobile device from a power saving mode to a normal mode, the normal mode comprising displaying a user menu to set the second security mode in the user finger reachable area such that the user finger of a user hand holding the mobile device reaches the user menu.

7. The medium of claim 1, wherein:
the mobile device further comprises a switch; and
the method further comprises applying the first security mode of receiving the password through the panel to unlock the mobile device, in response to a selection of the switch according to the determination that the mobile device is not in the time condition.

8. The medium of claim 1, wherein:
the mobile device further comprises a switch; and
the method further comprises applying the second security mode without receiving the password to unlock the mobile device, in response to a selection of the switch according to the determination that the mobile device is in the time condition.

9. The medium of claim 1, wherein:
the mobile device further comprises a switch; and
the method further comprises applying the first security mode of receiving the password to unlock the mobile device, when the second security mode fails in response to a selection of the switch according to the determination that the mobile device is in the time condition.

10. The medium of claim 1, wherein:
the panel comprises a user finger reachable area and a user finger unreachable area;
the mobile device further comprises a switch; and
the unlocking the mobile device further comprises unlocking the mobile device from a power saving mode to a normal mode in response to a selection of the switch, the normal mode comprising displaying a user menu to set the second security mode in the user finger reachable area such that the user finger of a user hand holding the mobile device reaches the user menu.

11. The medium of claim 1, wherein:
the panel comprises a user finger reachable area and a user finger unreachable area;
the mobile device further comprises a switch; and
the unlocking the mobile device further comprises unlocking the mobile device from a power saving mode to a normal mode in response to a selection of the switch, the normal mode comprising displaying the one or more menus in the user finger reachable area such that the user finger of a user hand holding the mobile device reaches the one or more menus.

12. The medium of claim 1, wherein the method further comprises:
sensing a second motion of a user of the mobile device by using a second sensor;
applying the first security mode of receiving a password through the panel to unlock the mobile device in response to the sensed second motion, according to the determination that the mobile device is not in the time condition; and
applying the second security mode without receiving the password to unlock the mobile device in response to the sensed second motion, according to the determination that the mobile device is in the time condition.

13. The medium of claim 12, wherein the method further comprises:
applying the first security mode of receiving the password through the panel to unlock the mobile device when the second security mode fails.

14. The medium of claim 1, wherein
the first security mode further comprises determining whether the password matches a set password stored in the mobile device, and unlocking the mobile device according to the determination that the password matches the set password; and
the second security mode further comprises determining whether a condition matches a set condition stored in the mobile device, and unlocking the mobile device according to the determination that the condition matches the set condition.

15. The medium of claim 1, wherein:
the panel comprises a user finger reachable area and a user finger unreachable area; and
the unlocking the mobile device further comprises unlocking the mobile device from a power saving mode to a normal mode in response to the sensed motion, the normal mode comprising displaying a user menu to set at least one of the first security mode and the second security mode in the user finger reachable area such that the user finger of a user hand holding the mobile device reaches the user menu.

16. The medium of claim 1, wherein:
the panel comprises a screen with a line between a user finger reachable area and a user finger unreachable area; and
the unlocking the mobile device further comprises unlocking the mobile device from a power saving mode to a normal mode in response to the sensed motion, the normal mode comprising displaying the one or more menus in the user finger reachable area such that the user finger of a user hand holding the mobile device reaches the one or more menus.

17. The medium of claim 1, wherein the second security mode further comprises:
determining that a current condition of the mobile device is a set condition as an authorized user stored in the mobile device, the set condition being stored in the mobile device, and
unlocking the mobile device, according to the determination that the current condition of the mobile device is the set condition as the authorized user of the mobile device.

18. The medium of claim 1, wherein the second security mode further comprises;
determining whether the mobile device is in a safe zone user as an authorized user of the mobile device; and
unlocking the mobile device according to the determination that the mobile device is on the safe zone.

19. The medium of claim 1, wherein the second security mode further comprises;
determining whether the mobile device communicated with the external device as an authorized user of the mobile device; and
unlocking the mobile device according to the determination that the mobile device communicates with the external device.

20. The medium of claim 19, wherein the method further comprises unlocking the mobile device according to the first security mode when the second security mode fails to detect the external device.

21. The medium of claim 19, wherein the external device comprises a Bluetooth device or a WiFi device, and the authorized used is stored in the mobile device.

22. The medium of claim 19, wherein the external device comprises a WiFi device for data transmission through an internet.

23. The medium of claim 19, wherein the external device comprises at least one of a medical device, a home appliance, and a second mobile device as the authorized user of the mobile device.

24. The medium of claim 19, wherein the panel comprises a user finger reachable area and a user finger unreachable area, and the method further comprises displaying a user menu to select the external device in the user finger reachable area such that the user finger of a user hand holding the mobile device reaches the user menu to select the external device.

25. The medium of claim 19, wherein:
the panel comprises a user finger reachable area and a user finger unreachable area; and
the unlocking the mobile device further comprises changing the mobile device from a power saving mode to a normal mode, the normal mode comprising displaying a user menu to select the external device in the user finger reachable area such that the user finger of a user hand holding the mobile device reaches the user menu to select the external device.

26. The medium of claim 1, wherein:
the external device comprises an access point as an authorized user of the mobile device; and
the second security mode further comprises determining whether the mobile device is in a wireless communication condition of communicating with the access point and an area condition.

27. The medium of claim 26, wherein the area condition comprises at least one of an area defined by a line on a diagram, an area in which the mobile device is disposed, a house in which a user of the mobile device stays, and a house in which the access point is located.

28. The medium of claim 26, wherein the access point comprises a wireless access point connecting to a wired network for data transmission through an Internet.

29. The medium of claim 26, wherein the method further comprises setting the area condition after the wireless communication has been set.

30. The medium of claim 26, wherein:
the panel further comprises a user finger reachable area and a user finger unreachable area; and
the method further comprises displaying a user menu to set the area condition at the user finger reachable area such that the user finger of a user hand holding the mobile device reaches the user menu to set the area condition.

* * * * *